(12) United States Patent
Patton et al.

(10) Patent No.: US 7,133,155 B2
(45) Date of Patent: Nov. 7, 2006

(54) METHOD AND APPARATUS FOR MODIFYING A PORTION OF AN IMAGE IN ACCORDANCE WITH COLORIMETRIC PARAMETERS

(75) Inventors: David L. Patton, Webster, NY (US); John R. Fredlund, Rochester, NY (US); John D. Buhr, Newtown, PA (US)

(73) Assignee: Eastman Kodak Company, Rochester, NY (US)

( * ) Notice: Subject to any disclaimer, the term of this patent is extended or adjusted under 35 U.S.C. 154(b) by 629 days.

(21) Appl. No.: 10/106,760

(22) Filed: Mar. 26, 2002

(65) Prior Publication Data

US 2002/0105662 A1    Aug. 8, 2002

Related U.S. Application Data

(63) Continuation-in-part of application No. 09/216,900, filed on Dec. 21, 1998, now Pat. No. 6,396,599.

(51) Int. Cl.
*G06K 15/00* (2006.01)

(52) U.S. Cl. ............... 358/1.9; 382/162; 382/167; 358/518; 358/530

(58) Field of Classification Search ........... 382/164, 382/118, 190, 167, 162, 203, 254, 1–9, 500, 382/518, 530, 520, 1.15; 358/1.9, 500, 518, 358/530, 520, 1.15
See application file for complete search history.

(56) References Cited

U.S. PATENT DOCUMENTS

| | | | |
|---|---|---|---|
| 3,649,748 A | 3/1972 | Knauer | 348/653 |
| 4,176,946 A | 12/1979 | Takahashi | 355/38 |
| 5,027,420 A | 6/1991 | Takebayshi et al. | 382/39 |
| 5,029,312 A | 7/1991 | Goenner | 355/38 |
| 5,212,518 A | 5/1993 | Numakura et al. | 355/77 |
| 5,225,900 A | 7/1993 | Wright | 358/95 |
| 5,296,884 A | 3/1994 | Honda et al. | 354/106 |
| 5,296,945 A | 3/1994 | Nishikawa et al. | 358/518 |
| 5,300,974 A | 4/1994 | Stephenson, III | 354/75 |
| 5,390,381 A | 2/1995 | LaMantia | |
| 5,447,811 A | 9/1995 | Buhr et al. | 430/20 |
| 5,488,429 A | 1/1996 | Kojima et al. | 348/653 |
| 5,528,339 A | 6/1996 | Buhr et al. | 355/32 |
| 5,638,136 A | 6/1997 | Kojima et al. | 348/652 |
| 5,710,954 A | 1/1998 | Inoue | 396/374 |
| 5,715,377 A | 2/1998 | Fukushima et al. | 355/588 |
| 5,726,737 A | 3/1998 | Fredlund et al. | 355/40 |
| 5,815,244 A | 9/1998 | Tokuda | 355/41 |
| 2002/0030831 A1* | 3/2002 | Kinjo | 358/1.9 |
| 2003/0007071 A1* | 1/2003 | Goto | 348/61 |
| 2003/0152283 A1* | 8/2003 | Moriwaki | 382/274 |

FOREIGN PATENT DOCUMENTS

| | | |
|---|---|---|
| EP | 0552016 | 7/1993 |
| EP | 1128660 A2 * | 8/2001 |
| JP | 2002044469 * | 2/2002 |

\* cited by examiner

*Primary Examiner*—Jerome Grant, II
(74) *Attorney, Agent, or Firm*—Thomas J. Strouse

(57) ABSTRACT

A method and apparatus for modifying images. The method includes the steps of analyzing a digital image file of an image so as to identify at least one predetermined colorimetric parameter; and automatically modifying that portion of said image having said at least one predetermined colorimetric parameter to a second predetermined colorimetric parameter so as to produce a modified digital image.

13 Claims, 5 Drawing Sheets
(1 of 5 Drawing Sheet(s) Filed in Color)

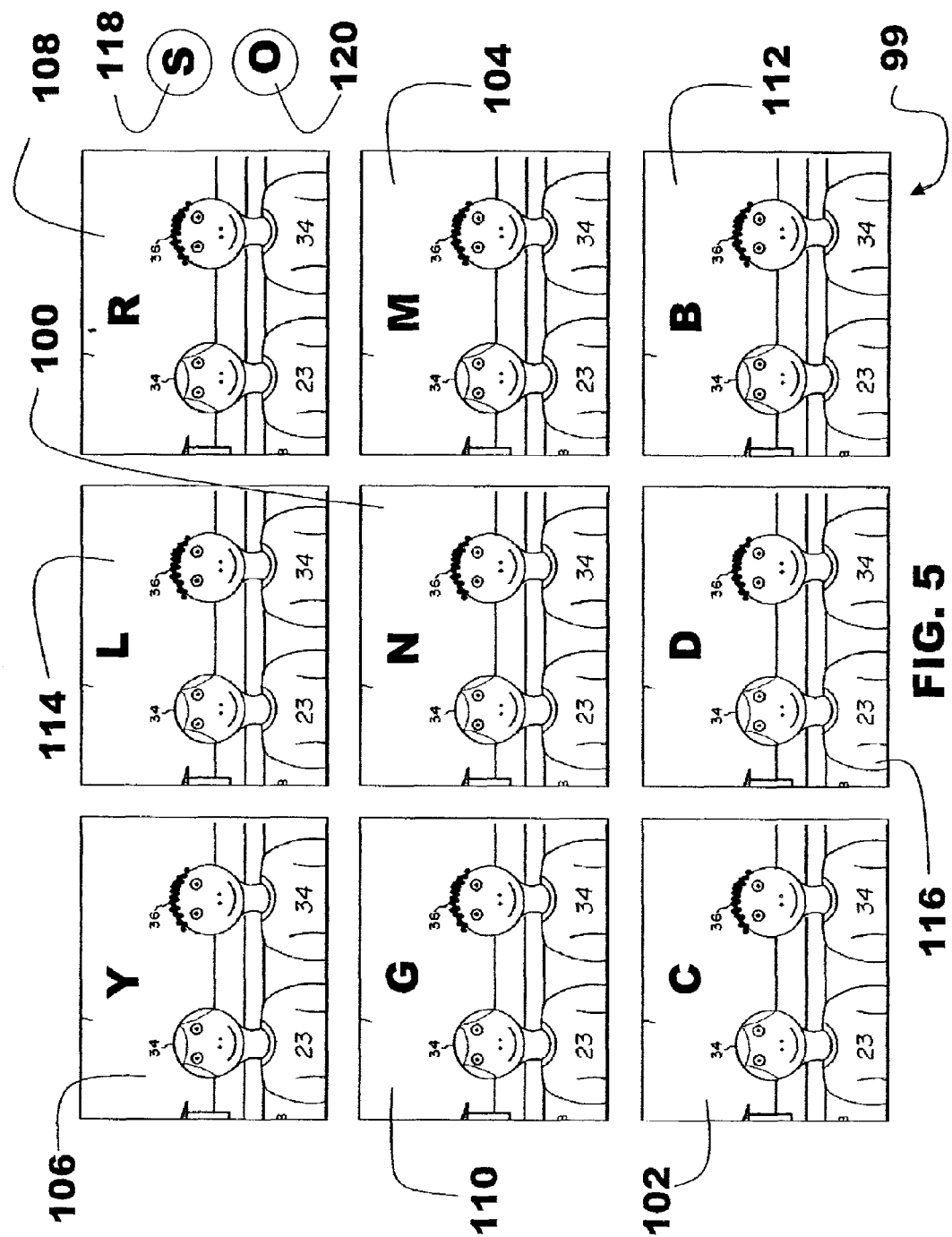

METHOD AND APPARATUS FOR MODIFYING A PORTION OF AN IMAGE IN ACCORDANCE WITH COLORIMETRIC PARAMETERS

CROSS REFERENCE TO RELATED APPLICATIONS

This is a continuation-in-part of application Ser. No. 09/216,900, filed Dec. 21, 1998, entitled: METHOD AND APPARATUS FOR MODIFYING A PORTION OF AN IMAGE IN ACCORDANCE WITH COLORIMETRIC PARAMETERS, in the names of David L. Patton, John R. Fredlund, and John D. Buhr, which is now U.S. Pat. No. 6,396,599.

FIELD OF THE INVENTION

The present invention relates to adjusting the skin tone in a reproduction of an image, and more particularly, to a photographic color imaging system that selectively adjusts the skin tone of individuals in images in accordance with customer preferences.

BACKGROUND OF THE INVENTION

Color negative/positive photographic systems in use today are designed to produce pleasing prints for most of the people in a target population. The print appearance includes both pleasing tone and color reproduction to produce colorful prints with good contrast, and particularly excellent skin tone reproduction. Typically, existing photo systems are designed to be optimized for a particular skin type and preference. For example, Caucasian, Oriental, Asian, Indian, and/or Black. Photographic film, paper, and printer sets-ups are generally designed for providing pleasing color for a particular market segment. In taking photographs of an individual of a first skin tone type with a system designed for a second skin tone type, the skin tones of the first skin tone type will appear undesirable. For example, in a system designed for Caucasians, individuals having a darker skin tone will result in the darker skin tones appearing compressed. This often results in the facial features being lost in an overly dark representation.

It is possible to design a photographic system that is optimized for dark-tone skin tone reproduction. This can be done by adjusting the photographic film, paper, and/or printer set-ups. However, this kind of system would not produce optimum light-tone skin tone reproductions. Solving the problem in this manner would still result in the inability of a single system to produce pleasing skin tone reproduction, regardless of the lightness of the skin tones in the scene. Marketing two different films would increase marketing and inventory costs, and potentially lead to confusion in the customer's mind about the circumstances for use of the different systems.

With current photo systems, the only option available for improving the reproduction of skin tones, which the system is not designed for, is to adjust the print density and color balance during printing. Neither of these adjustments produce preferred prints because they alter the reproduction of portions of the scene that are not skin tones.

U.S. Pat. No. 5,300,974 to Stephenson discloses a system that allows the camera user to record the color balance preference.

U.S. Pat. No. 5,710,954 to Inoue discloses a system involving a video image in which the customer selects a preferred color balance.

U.S. Pat. No. 5,726,737 to Fredlund et al describes a system for controlling photofinishing of photosensitive material.

U.S. Pat. Nos. 5,488,429 and 5,638,136 to Kazuaki et al describes a method and apparatus that detects skin tones in an image.

Thus, there is a need to provide an economical photographic system that can be adjusted to compensate for different skin tones in accordance with customer preferences without concern as to the tone characteristics of the originating film or providing a plurality of different film types, each being directed to a different skin type. There is also a need to provide a system wherein the customer and/or photo lab can select manually or automatically the desired skin tone characteristics. There is also a need for a method by which the customer can determine a preference in both color and density and convey that preference to the photofinisher so the preference can be acted on in the making of the print. In the case of an automatic printing device such as a kiosk or an electronic display, a means is needed to automatically convey the customer's preference to the device so the preference can be acted on in the making of the print or in the displaying of the image.

Another problem occurs when changing the skin tone pixel values in a region that is a subset of a human face or figure. As in the case of a dark skinned individual, the skin tone pixel values of a light skinned individual in the same scene whose skin is in dark shadows may inadvertently be changed.

In a system made in accordance with the present invention, a solution is provided for eliminating and/or minimizing the problems of the prior art that can improve images provided on conventional photosensitive media, or in digital format. Print algorithms are provided in a digital photofinishing system, which changes the appearance of the skin tone in a print to a selected preference. The preference may be obtained by a selection option provided or detected on the film processing order, encoded on the film itself, or carried out automatically by the photofinisher providing a specific skin tone preference desired in a region of a country and/or world. The skin tone adjustment can be one of one or more selections available in the algorithm, or accessed from a customer profile.

SUMMARY OF THE INVENTION

The present invention is directed to overcoming one or more of the problems set forth above. Briefly summarized, according to one aspect of the present invention, there is provided a method of modifying images, comprising the steps of:

a) analyzing a digital image file of an image so as to identify at least one area representing skin tone of an individual;

b) displaying a plurality of color rendition for the skin tone;

c) selecting a color preference for the identified skin tone, and d) modifying that portion of the image having the at least one skin tone to the selected color preference for producing a modified digital image.

In accordance with another aspect of the present invention there is provided a method of modifying images, comprising the steps of:

a) analyzing a digital image file of an image so as to identify at least one area representing a skin tone of an individual; and b) modifying the at least one area to a pre-selected color preference for producing a modified digital image.

In accordance with yet another aspect of the present invention there is provided a method of modifying images, comprising the steps of:

a) displaying a plurality of color rendition for an identified skin tone;

b) selecting a color preference for the identified skin tone, and c) applying the color preference to an area of a digital image that has been analyzed as having the identified skin tone.

In accordance with another aspect of the present invention there is provided a still yet a computer software product for modifying of digital images such that when loaded on to computer will cause the computer to perform the steps of:

a) analyzing a digital image file of an image so as to identify at least one area representing skin tone of an individual;

b) displaying a plurality of color rendition for the skin tone;

c) selecting a color preference for the identified skin tone, and d) modifying that portion of the image having the at least one skin tone to the selected color preference for producing a modified digital image.

In accordance with another aspect of the present invention there is provided a computer software product for modifying of digital images such that when loaded on to computer will cause the computer to perform the steps of:

a) analyzing a digital image file of an image so as to identify at least one area representing a skin tone of an individual; and b) modifying the at least one area to a pre-selected color preference for producing a modified digital image.

In accordance with another aspect of the present invention there is provided a computer software product for modifying digital images such that when loaded on to a computer will cause the computer to perform the steps of:

a) displaying a plurality of color rendition for an identified skin tone;

b) selecting a color preference for the identified skin tone, and c) applying the color preference to an area of a digital image that has been analyzed as having the identified skin tone.

The above, and other objects, advantages, and novel features of the present invention will become more apparent from the accompanying detailed description thereof when considered in conjunction with the following drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the detailed description of the preferred embodiments of the invention presented below, reference is made to the accompanying drawings in which:

FIG. 5 is a schematic of a selection display enabling the viewer to select a preferred image balance.

DETAILED DESCRIPTION OF THE DRAWINGS

The present description will be directed in particular to elements forming part of, or in cooperation more directly with, the apparatus in accordance with the present invention. It is understood that elements not specifically shown or described may take various forms well known to those skilled in the art.

Figure 1:
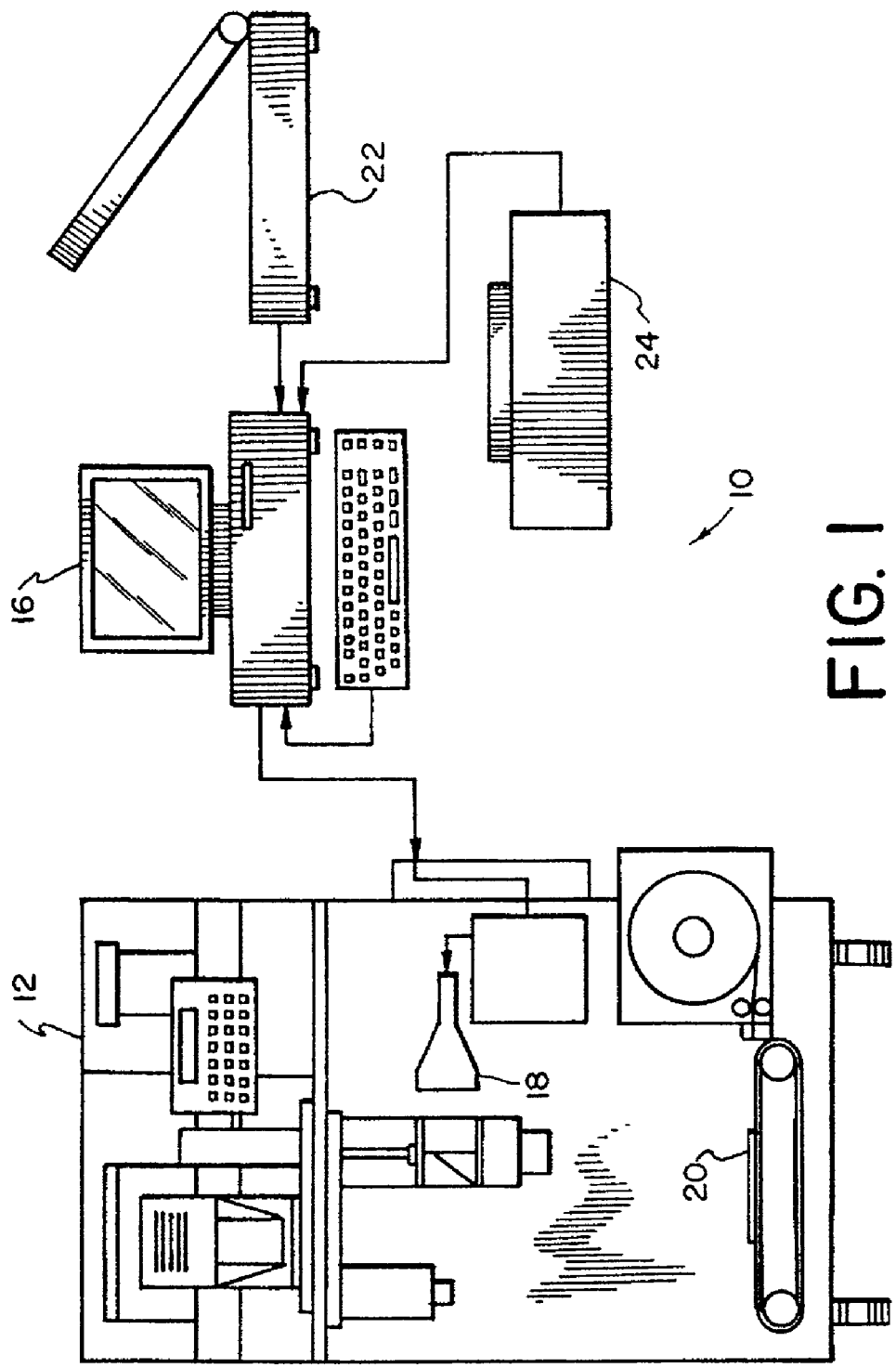
FIG. 1 is a schematic diagram of a photographic printing apparatus made in accordance with the present invention.

Referring to FIG. 1, there is illustrated a photographic printing system 10 made in accordance with the present invention. In the particular embodiment illustrated, system 10 includes a digital minilab printer 12. An example of such a suitable digital minilab is the Gretag Imaging Master lab 740 Digital with Kodak Digital Printer. In particular, this digital minilab printer 12, which can make a print onto photographic paper from a digital record, uses a CRT printer. A CPU/computer 16 is provided for allowing entry of data to printer 12 and for controlling operation of the minilab printer 12. While the computer 16 is illustrated as a separate device from the minilab, it may be an integral part of the printer 12. The minilab printer 12, in the embodiment illustrated, is provided with a cathode ray tube 18 for exposing an image onto the photosensitive material 20. For example, photosensitive paper that is then in turn processed for development. It is, of course, understood that any other desired digital printing device may be utilized, including, for example, but not by way of limitation, LEDs, lasers, ink jet, thermal, electro photographic, or other digital type printers. The system 10 further includes a digital scanner 22 for scanning images placed in the scanner and converting the information to a digital signal. An appropriate digital printer scanner 22 and film scanner 24 that can be utilized in the system 10 is exemplified by the Kodak Digital Science Scanner 3500 which scans photographic film, or the Hewlett Packard Scan jet IICX color scanner which scans prints. The digital image file can also come from a digital camera such as a KODAK DC 265 Digital Camera. A method for allowing the user of a digital camera to input personal preferences is described later in FIG. 4. In the embodiment illustrated, scanner 22 is designed to scan film negatives so as to obtain a digital record of the images on the negative film. After the digital record of the image has been obtained, the digital record is transferred to the printer by the appropriate software previously provided in the computer 16 such that a print image can be made by the printer 12.

Figure 3:
FIG. 3 is a photograph illustrating a failure mode produced by the apparatus of FIG. 1.

A computer algorithm provided in computer 16 first identifies if skin tones are present in the image file obtained by scanner 22. This is accomplished by determining the colorimetric values of the image pixels scanned by scanner 22 using standard colorimetric techniques. Colorimetry is the measurement of color. A set of colorimetric parameters for an object, based on measured colorimetric parameters, can quantify the color of the object as it appears to the average observer under a specific set of viewing conditions. Techniques described in U.S. Pat. No. 5,528,339 can be used to identify the colorimetric values of the images suitable for use with the present invention, which are hereby incorporated by reference in their entirety. The algorithm is preprogrammed with a set of colorimetric parameters for various types of skin tone. Predetermined colorimetric values may be set for each of the desired skin types, for example, Caucasian, Oriental, Asian, Indian, and/or Black. This results in selectively identifying portions of the image obtained by the scanner 22. After a face has been located using the face recognition algorithm, the desired skin type can be identified and only the pixels located in the identified facial region are subjected to the change. Another method for identifying skin tone areas is to use human figure recognition algorithms such as described in U.S. Ser. No. 09/737,026, IMAGE PROCESSING METHOD FOR DETECTING HUMAN FIGURES IN A DIGITAL IMAGE, by Jiebo Luo. After a human figure has been identified, the contiguous areas of skin tone can be adjusted accordingly. Use of a method of identifying contiguous regions such as described in U.S. Ser. No. 09/395,002, TWO-STAGE SCHEME FOR TEXTURE SEGMENTATION BASED ON CLUSTERING USING A FIRST SET OF FEATURES AND REFINEMENT USING A SECOND SET OF FEATURES, by Jeibo Luo, allows modification of a segment or region of contiguous pixels. In this case, a human face or figure need not be determined. If the pixels in the segment are determined to be of the predetermined color values, then the entire segment will be changed in the same fashion as the pixels of predetermined color value. These techniques avoid the problem of changing pixel values in a region that is a subset of a human face or figure, such as when dark shadows intermittently cover the area of flesh tones as illustrated in FIG. 3. Having determined that a particular portion is of a particular flesh tone, the next step would be to modify the flesh tone to a particular hue and/or color. Preferably, the type and source of the image is entered into the computer 16. For example, the manufacturer of the photosensitive media that was scanned, the type of media scanned (if it is paper or film, etc.), and/or color characteristics of the media from which the images were obtained. The color characteristics may be preprogrammed into the algorithm for various known media of various media manufacturers. The so identified portions are then modified to pre-selected colorimetric values, the selection of which is determined by the preference of the photo lab or consumer.

Figure 4:
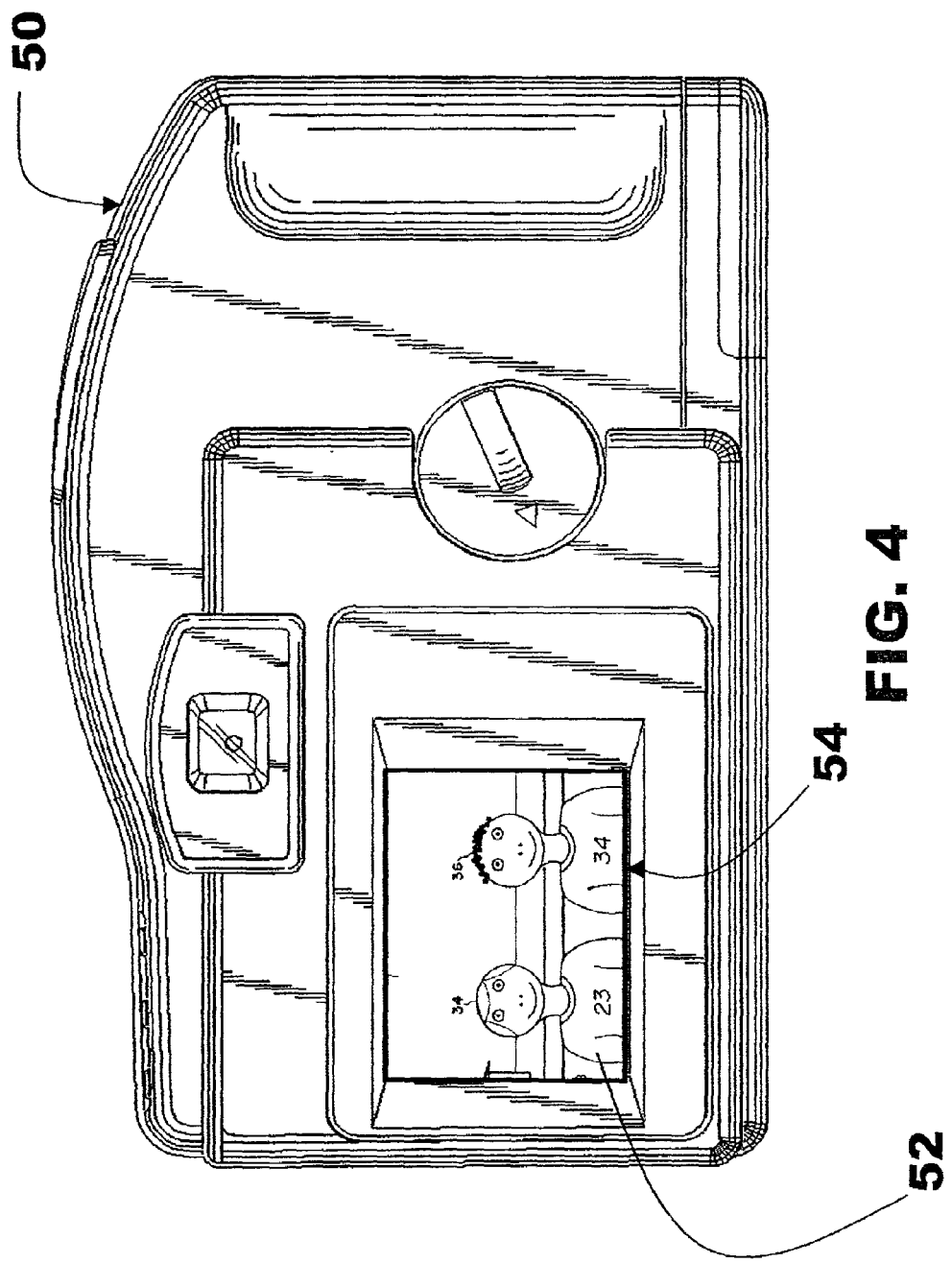
FIG. 4 is a schematic of a digital camera made in accordance with the present invention.

Referring now to FIG. 4, there is illustrated a digital camera 50 made in accordance with the present invention. A preferred color preference may be selected by the camera user and entered into the camera and applied to all the images in the camera's memory or applied to a picture about to be captured. A preferred color preference may be selected and annotated to a selected image 52 by the consumer using the camera at the time of capture. After the image 52 has been captured, when reviewing the image 52 in the display 54 a different preference may be applied to each subject 34 and 35 in the image 52 as selected by the user. For example, the user using a stylus or a cursor (not shown) may identify the skin tone preference for Caucasian skin to the subject 34 and the skin tone preference for dark skin to subject 36. The preference chosen is stored as part of the captured image file. Alternatively analysis and modification may be done to the image 52 in the camera 50 by showing the user several choices of skin preference as described in FIG. 4., and passed on to the photofinisher as instructions or stored as part of the captured image file.

A consumer's selected preferred image balance can be determined using a hardcopy or soft selection display as is illustrated in FIG. 5. The soft selection display may be displayed in the digital camera display or on a display such as a monitor, TV, PDA, etc. A suitable selection display 99 contains a reference balanced image 100 and offers at least one additional image at a different balance position that may be selected by the user. A particularly desirable layout is shown in FIG. 5, in which the reference image 100 appears in the center and is ringed by a set of 8 images, each shifted in the primary colorbalancing hues (CMYRGB) such as a cyan image 102, a magenta image 104, a yellow image 106, a red image 108, a green image 110, and a blue image 112 or neutral density (Light or Dark) from the center position such as a light image 114 and a dark image 116. In addition, toggle buttons 118 and 120 are available to change the viewer's alterations between skin tone adjustments 118 and non-skin tone adjustments 120 as is a image difference adjuster that permits the viewer to control the magnitude of the displayed image version differences. The user first selects whether he wishes to change the balance of the skin tones or the non-skin tones. If the viewer prefers one version of the displayed images other than that in the center, he or she selects the preferred image and the display changes to place the selected balance in the middle, and adjusts the other images to present a new balance ring. As the user approaches the most preferred balance, the magnitude selector is adjusted so that the displayed image variations have less difference. If the viewer determines that the skin tone and non-skin tone regions require different balances, he or she selects the toggle to operate on the object type that is not yet preferred, and then uses the same procedure to optimize the selected object type. The user may continue to adjust skin tone and non-skin tone image portions independently until the most preferred image is obtained.

Another method used to determine consumer preference is a graduated paired comparison. In a graduated paired comparison, the consumer is shown two images at a time, one image being slightly different from the other in a particular hue and/or color. The consumer is asked to choose the image he or she prefers until he or she is satisfied with a second image as the preferred image. The difference from the first image and the second image defines the consumer preference.

Both of these techniques are known by those skilled in the art. Additionally, the photofinisher may determine the consumer preference by knowing the particular hue and/or color correction used in making a print. For example in images containing faces, the consumer may routinely ask the photofinisher to print images containing faces by addition of one button blue, as is known by those skilled in the art. The selected preference may be preprogrammed into the algorithm or entered by the photofinishing lab operator or consumer. The algorithm modifies the digital file in accordance with the selected preference. The modified image is then sent to the printer for printing onto the photosensitive media. The algorithm may select the only available single alternative reproduction adjustment, such as a dark-toned skin tone adjustment. Or the algorithm may select among a set of available alternative reproduction adjustments, such as by race and lightness range, based on customer option or the identity or darkness of skin tones in the captured scene. The available adjustments may include a customer-specified custom option, created as a profile by the customer.

In a professional portrait setting, the identification of skin tones may be facilitated by the knowledge that the image captured is of a person, and that the person is usually the subject of the portrait. In this situation where a face is captured, usually in front of a contrasting background, assumptions can be made on the geometry of the region that is to be adjusted. A face-shaped assumption may be applied to determine the region of pixels that will be altered. All the pixels in that region will be adjusted according to the consumer or photographer preference. This adjustment may occur in the camera. The user preferences (or photographer preferences) may be input on the camera using the oncamera display as the feedback device according to the procedures described above. The adjustment of pixels may occur in the camera, or may occur in a computer to which the images are transmitted in accordance with the preferences input to the camera. Additionally, the adjustment of pixels may occur in the camera on the basis of user preferences uploaded from a computer.

For example in a professional portrait setting where multiple people are captured in the same frame, first a single face assumption is used, and upon not finding a match, a dual face assumption can be used. The assumption for the number of faces can be increased until the number appropriate to the number of people in the frame is reached. A simplified manner of determining the number of faces can be used. The photographer may merely key in the number of individuals by means of a manual switch. In the case where a plurality of individuals are in the image and only selected individuals are desired to be corrected, a method for designating each individual is provided.

The algorithms to identify and change the predefined color pixels may be applied during photofinishing of photographic film, in an electronic camera, or in a computer running a computer program product. In the case of the computer program product, the program operates on images in a similar fashion to that described above for the photofinishing operation or the digital camera. The user preference is specified, the region of the image determined, and the pixels in the determined region are adjusted according to the user preference.

When the algorithm alters the default skin tone reproduction, the adjustment may consist of a print density or color balance bias, or more preferred, the application of a matrix or 3D table of parameters to the digital capture image. The 3D table of parameters is the preferred embodiment because it allows skin tones to be altered without altering the remaining colors in the image. It is also possible to alter the color reproduction of the skin tones within the scene by applying a matrix only if the pixel value is a skin tone.

The preferred adjustment will often consist of a reduction in skin tone colorfulness and a reduction in the contrast of the reproduction in color region of the skin tones. Generally, it is preferred to maintain a neutral gray scale in the image while adjusting the skin tones to their preferred colorimetric position. However, any adjustment preferred by the customer may be implemented.

Figure 2:
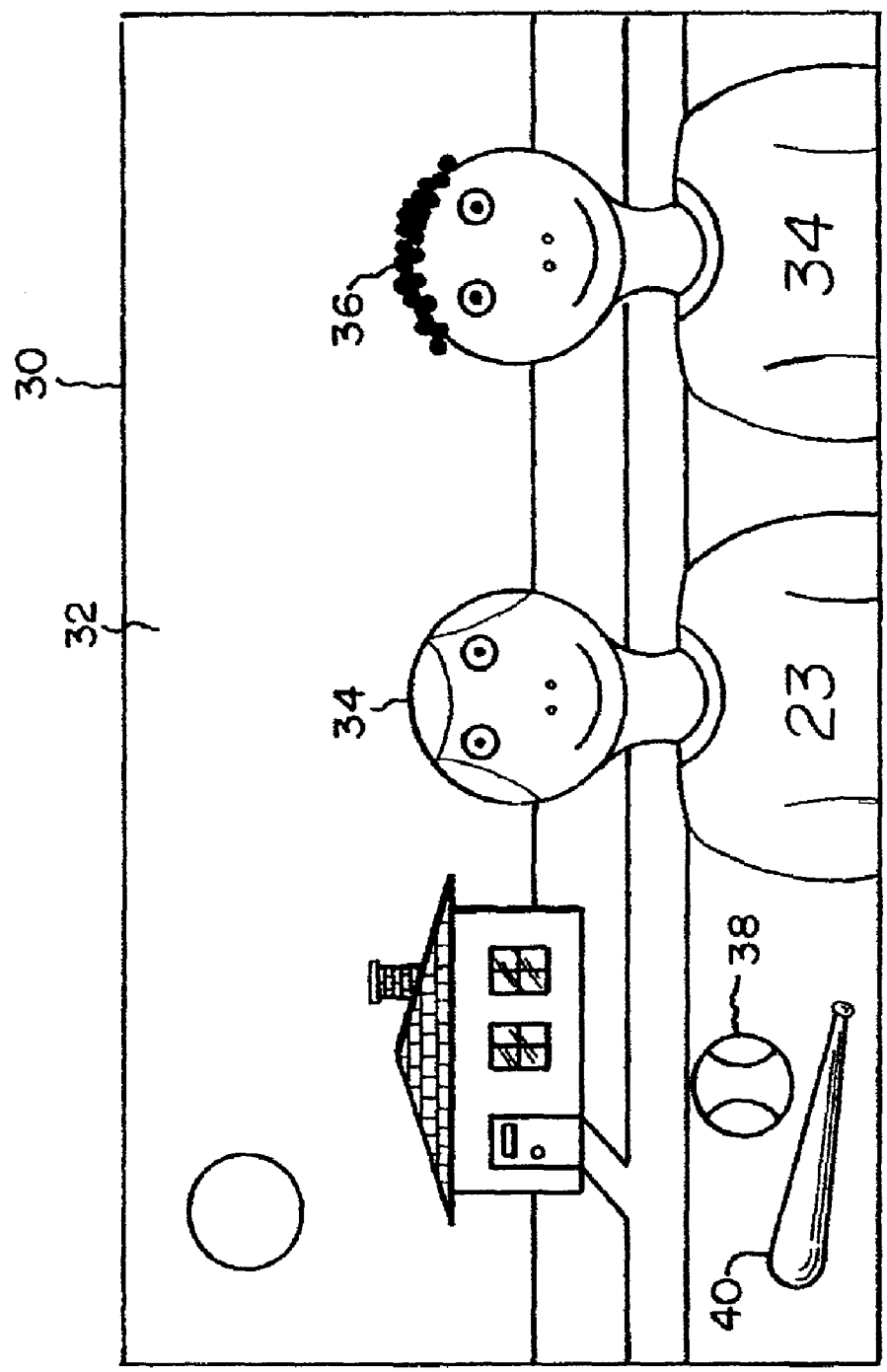
FIG. 2 illustrates a photograph that is to be reproduced by the apparatus of FIG. 1.

In order to better understand the present invention, a brief description of its operation will be discussed. Referring to FIG. 2, there is illustrated a portion of a negative film 30 having an image scene 32 printed thereon. In the particular embodiment illustrated, the scene 32 includes a variety of items and individuals. Scene 32 includes a first individual 34 of a first skin tone and a second individual 36 of a second type skin tone, a basketball 38, and a bat 40 shown against a blue sky 42 and green grass 44. In the embodiment illustrated, individual 34 has Caucasian skin tones and individual 36 has dark skin tones. The film 30 is placed in scanner and a digital record file of the image scene 32 is obtained and sent to computer 16. A colorimetric analysis of the image data is accomplished by the pre-stored algorithm in the computer and the flesh tones, as defined by predetermined colorimetric parameters, are identified. Once having identified portions of the image that are flesh tones, all such identified flesh tone areas of the scene image are modified in accordance with selected skin tone characteristics. For example, if the lab making the reproduction of the scene image is in a region where there are predominately dark skinned individuals, or the individual requesting the reproductions is dark skinned, the algorithm can be programmed to modify only the identified flesh tone areas in accordance with colorimetric parameters best suited to dark skinned flesh tones. The customer selection can be made by checking an appropriate box on the order form used for ordering of the prints, or the algorithm can be automatically activated by the algorithm that analyzes the image data from the scanner to recognize the skin tone of a particular ethnic group. It is, of course, understood that one, some and/or all various skin tone modifications may be applied to all the images.

The present invention provides prints that are pleasing to the customer regardless of the lightness of skin tones in the photographed scene. Given that generally the same photographic films and papers are distributed worldwide, a digital image-processing algorithm is introduced in a digital photofinishing system to alter the appearances relative to a predetermined scene reproduction automatically or manually as desired by the photographic lab, or as selected by the consumer. The present invention avoids the need of providing separate film types throughout the world to accommodate local preferences. Additionally, the present invention modifies only the area containing flesh tones, thereby maintaining the overall color integrity of the remaining portion of the image. The present invention also provides the ability to change more than one different flesh tone in a scene to a preferred preference.

The invention has been described in detail with particular reference to certain preferred embodiments thereof, but it will be understood that variations and modifications can be effected within the scope of the invention.

Parts List
10 Photographic printing system
12 Digital minilab printer
16 CPU/computer
18 Cathode ray tube
20 Photosensitive material
22 Digital scanner
24 Film scanner
30 Negative film
32 Image scene
34 First individual
35 Subject
36 Second individual
38 Basketball
40 Bat
42 Blue sky
44 Green grass
50 Digital camera
52 Image
54 Display
99 Selection display
100 Reference balance image
102 Cyan image
104 Magenta image
106 Yellow image
108 Red image
110 Green image
112 Blue image
114 Light image
116 Dark image
118 Toggle button
120 Toggle button

What is claimed is:

1. A method of modifying images captured on a digital camera of the type that includes a built in display, comprising the steps of:

a) automatically analyzing digital images captured by said camera and identifying that a skin tone is present in said digital image;
b) automatically displaying a plurality of color renditions for said identified skin tone on said built in display;
c) selecting a color rendition on said digital camera for said identified skin tone; and
d) applying said color to at least one area of a digital image having said identified skin tone to create a modified digital image file.

2. A method according to claim 1 wherein said skin tone is of a particular type.

3. A method according to claim 2 wherein said skin tone is directed to light skinned individuals.

4. A method according to claim 2 wherein said skin tone is directed to dark skinned individuals.

5. A method according to claim 1 wherein said at least one area is within a portion of the image identified by facial recognition.

6. A method according to claim 1 wherein said at least one area is within a portion of the image identified by using figure recognition.

7. A method according to claim 1 wherein said at least one area is within a portion of the image identified by using image segmentation.

8. A method according to claim 1 wherein said at least one area is tagged so that a downstream printer does not attempt to modify said at least one area again.

9. A method according to claim 1 wherein said selected color rendition is downloaded to a computer.

10. A method according to claim 9 wherein the number of people in the image is identified and is used to assist in determining areas having said at least one skin tone.

11. A method according to claim 1 wherein said at least one area is tagged so that a downstream printer does not attempt to modify said at least one area again.

12. A method according to claim 1 further comprising the steps of printing, storing, or otherwise transferring said modified digital image file.

13. A method according to claim 12 wherein said modified digital image file is printed by a digital printer.

* * * * *